(12) United States Patent
Nguyen (10) Patent No.: US 10,041,007 B2
(45) Date of Patent: *Aug. 7, 2018

(54) DEMULSIFIER COMPOSITION AND METHOD OF USING SAME

(71) Applicant: Ecolab USA Inc., St. Paul, MN (US)

(72) Inventor: Duy T. Nguyen, Sugar Land, TX (US)

(73) Assignee: Ecolab USA Inc., St. Paul, MN (US)

( * ) Notice: Subject to any disclaimer, the term of this patent is extended or adjusted under 35 U.S.C. 154(b) by 57 days.

This patent is subject to a terminal disclaimer.

(21) Appl. No.: 15/137,610

(22) Filed: Apr. 25, 2016

(65) Prior Publication Data

US 2016/0244678 A1 Aug. 25, 2016

Related U.S. Application Data

(63) Continuation of application No. 13/452,222, filed on Apr. 20, 2012, now Pat. No. 9,353,261, which is a continuation-in-part of application No. 13/431,003, filed on Mar. 27, 2012, now Pat. No. 9,701,888.

(51) Int. Cl.

| | |
|---|---|
| C09K 8/584 | (2006.01) |
| C09K 8/68 | (2006.01) |
| C09K 8/60 | (2006.01) |
| C10G 33/04 | (2006.01) |
| C08L 71/02 | (2006.01) |

(Continued)

(52) U.S. Cl.
CPC ............. C10G 33/04 (2013.01); C08L 71/02 (2013.01); C10G 31/08 (2013.01); E21B 43/34 (2013.01); C08G 2650/58 (2013.01)

(58) Field of Classification Search
CPC .. C09K 8/584; Y10S 507/935; Y10S 507/936; Y10S 507/937; Y10S 507/938
USPC .................. 507/240, 246, 254, 261, 203
See application file for complete search history.

(56) References Cited

U.S. PATENT DOCUMENTS

| 4,029,570 A | 6/1977 | Coffman et al. |
| 4,089,803 A | 5/1978 | Bessler |
| 5,035,876 A | 7/1991 | Castellano |

(Continued)

FOREIGN PATENT DOCUMENTS

| EP | 1639989 A1 | 3/2006 |
| KR | 20100107486 A | 10/2010 |

(Continued)

OTHER PUBLICATIONS

The International Search Report and Written Opinion dated Jun. 28, 2013, in connection with PCT Appln. No. PCT/US2013/033994.

(Continued)

*Primary Examiner* — Aiqun Li
(74) *Attorney, Agent, or Firm* — Kagan Binder, PLLC (57) ABSTRACT

Disclosed and claimed is a microemulsion-based demulsifier composition and a method of demulsifying an emulsion comprising hydrocarbon and water. The demulsifier composition includes (i) an oil-like phase comprising at least one nonionic surfactant having a hydrophilic-lipophilic balance (HLB) of less than about 9; (ii) a coupling agent capable of stabilizing the demulsifier composition; (iii) at least one water-soluble or dispersible nonionic surfactant that is different from the at least one nonionic surfactant in the oil-like phase; (iv) at least one additional surfactant selected from anionic, cationic, amphoteric, and combinations thereof; (v) at least one nonionic demulsifier; and (vi) water.

16 Claims, 3 Drawing Sheets

(51) Int. Cl.
*C10G 31/08* (2006.01)
*E21B 43/34* (2006.01)

(56) References Cited

U.S. PATENT DOCUMENTS

| | | | |
|---|---|---|---|
| 5,759,409 | A | 6/1998 | Knauf |
| 5,854,187 | A | 12/1998 | Blum et al. |
| 6,147,047 | A | 11/2000 | Robbins et al. |
| 6,294,093 | B1 | 9/2001 | Selvarajan et al. |
| 7,380,606 | B2 | 6/2008 | Pursley et al. |
| 7,566,744 | B2 | 7/2009 | Newman et al. |
| 7,615,516 | B2 | 11/2009 | Yang et al. |
| 7,655,603 | B2 | 2/2010 | Crews et al. |
| 7,886,824 | B2 | 2/2011 | Kakadjian et al. |
| 7,893,010 | B2 | 2/2011 | Ali et al. |
| 7,960,314 | B2 | 6/2011 | Van Zanten et al. |
| 7,989,404 | B2 | 8/2011 | Kakadjian et al. |
| 7,998,911 | B1 | 8/2011 | Berger et al. |
| 8,091,646 | B2 | 1/2012 | Quintero et al. |
| 2003/0032683 | A1 | 2/2003 | Spalding |
| 2003/0166472 | A1 | 9/2003 | Pursley et al. |
| 2006/0258541 | A1 | 11/2006 | Crews et al. |
| 2007/0272277 | A1 | 11/2007 | Jeffreys |
| 2008/0287324 | A1 | 11/2008 | Pursley et al. |
| 2009/0149557 | A1 | 6/2009 | Talingting-Pabalan et al. |
| 2009/0200027 | A1 | 8/2009 | Kakadjian et al. |
| 2009/0281004 | A1 | 11/2009 | Ali et al. |
| 2011/0021386 | A1 | 1/2011 | Ali et al. |
| 2011/0021388 | A1 | 1/2011 | Van Zanten et al. |
| 2011/0218126 | A1 | 9/2011 | Berger et al. |
| 2011/0220353 | A1 | 9/2011 | Bittner et al. |
| 2011/0247965 | A1 | 10/2011 | Nguyen |

FOREIGN PATENT DOCUMENTS

| | | |
|---|---|---|
| WO | 1999058631 A1 | 11/1999 |
| WO | 2009006251 | 1/2009 |

OTHER PUBLICATIONS

The International Search Report and Written Opinion dated Jul. 26, 2013, in connection with PCT Appln. No. PCT/US2013/037361.

The extended European Search Report dated Oct. 12, 2015, in connection with European Patent Appln. No. 13767501.3.

The extended European Search Report dated Nov. 16, 2015, in connection with European Patent Appln. No. 13778640.6.

DEMULSIFIER COMPOSITION AND METHOD OF USING SAME

CROSS REFERENCE TO RELATED APPLICATION

This application is a continuation in part of U.S. patent application Ser. No. 13/431,003, filed Mar. 27, 2012, currently pending.

TECHNICAL FIELD

This invention relates generally to novel microemulsion-based demulsifier compositions and methods of resolving emulsions of water and oil. More specifically, this invention concerns microemulsion-based demulsifer compositions comprising the disclosed surfactants and a stabilizing coupling agent. The invention has particular relevance to microemulsion-based demulsifier compositions and methods for resolving oil-in-water, water-in-oil, and complex emulsions of water and oil.

BACKGROUND OF THE INVENTION

Crude oil produced from geological formations can contain various amounts of water. Water and crude oil are naturally non-miscible; however, when naturally occurring interfacial active compounds are present, these compounds can aggregate on the water and oil interface and cause water to form droplets within the bulk oil phase. During crude oil lifting through production tubings, the water and oil encounters an increased mixing energy from rapid flow through chokes and bends. This additional mixing energy can emulsify the water and oil. Such an oil external, water internal two-phase system is commonly referred to as a crude oil emulsion, which can be quite stable. The presence of water in crude oil, however, can interfere with refining operations, induce corrosion, increase heat capacity, and result in reduced handling capacity of pipelines and refining equipment. Therefore, the crude oil that is to be shipped out of the oilfield should be practically free of water and usually has a maximum water content limit of about 0.5 to 3% by total weight, depending on the type of crude and oil company.

The emulsified water can also contain various amounts of salts. These salts are detrimental to crude oil refining processes due to potential corrosion in the refinery. In crude oil refining, desalting techniques comprise the deliberate mixing of the incoming crude oil with a fresh "wash water" to extract the water soluble salts and hydrophilic solids from the crude oil. Primary dehydration of the crude oil occurs in oil field water oil separation systems such as "free water knock out" and "phase separators." Quite often, these systems are not adequate for efficient separation due to factors such as over production, unexpected production changes, and system underdesigns. In these cases, emulsion-breaking chemicals are added to the production processes to assist and promote rapid water oil separations.

Commonly used emulsion-breaking chemicals or demulsifiers include alkylphenol formaldehyde resin alkoxylates (AFRA), polyalkylene glycols (PAG), organic sulfonates, and the like. These active ingredients are typically viscous and require a suitable organic solvent to reduce the viscosity of the demulsifier blend. Accordingly, there is an ongoing need for new, economical, environmentally-friendly, and effective chemicals and processes for resolving emulsions into the component parts of water and oil or brine.

For these reasons it is desired to have a demulsifier that does not require an organic solvent. It is also desired to have a demulsifier composition capable of resolving water external, water internal, and complex emulsions while having a broad dosage range.

SUMMARY OF THE INVENTION

This invention accordingly provides a novel microemulsion-based demulsifier composition effective in resolving emulsions of at least one hydrocarbon and water. In an aspect, the demulsifier composition includes (i) an oil-like phase comprising at least one nonionic surfactant having a hydrophilic-lipophilic balance (HLB) of less than about 9; (ii) a coupling agent capable of stabilizing the microemulsion-based demulsifier composition; (iii) at least one water-soluble or dispersible nonionic surfactant that is different from the at least one nonionic surfactant in the oil-like phase; (iv) at least one additional surfactant selected from anionic, cationic, amphoteric, and combinations thereof; (v) at least one nonionic demulsifier; and (vi) water.

It is an advantage of the invention to provide enhanced fluid recovery and relative permeability enhancement of fractured subterranean formations.

It is a further advantage of the invention to remove unwanted deposits from wellbore and production equipment.

It is yet another advantage of the invention to provide novel demulsifiers that are effective without the use of water-insoluble organic solvents (e.g., hydrocarbons, terpenes, and the like) and that are environmentally-friendly.

An added advantage of the invention includes wettability alteration, well cleanout, and reduced well damage due to phase trapping.

Another advantage of the invention is that the microemulsion demulsifier contains very small droplets of actives which can be water-insoluble whereby the droplets can deliver actives to the oil/water interface quickly and break the emulsion or prevent the emulsion formation.

An additional advantage of the invention is to reduce the viscosity of heavy oil thereby enhancing oil production.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims

DETAILED DESCRIPTION OF THE INVENTION

This invention fills an industrial need for improved demulsifiers for use in resolving emulsions of oil and water.

The present invention generally relates to a microemulsion-based petroleum demulsifier (also known as emulsion breakers) for resolving or otherwise "breaking" emulsions that typically form during crude petroleum extraction and/or refinement. As used herein, "emulsions" include water-in-oil emulsions and oil-in-water emulsions as well as complex emulsions. An aspect of the present invention is its usefulness for resolving emulsions by forming a microemulsion thereby reducing or eliminating the need for water-insoluble organic solvents and may also form in situ microemulsions when in contact with crude oil. In another aspect, the invention has usefulness to remove various nonpolar materials, such as oil-based mud, synthetic-based mud, paraffins, asphaltenes, slugs, schmoo, emulsions, and combinations thereof, from subterranean formations. Such removal may act to heal, restore, remediate the formations, and increase water injectivity.

The microemulsions of the present invention are typically single phase microemulsions but may also be multiphase according to alternative embodiments. In embodiments, the microemulsions are formed prior to pumping to the subterranean reservoir, or the microemulsions may be formed in situ in the subterranean reservoir or an injected microemulsion could form a new microemulsion incorporating nonpolar and polar fluids and particles already present in the formation. An in situ microemulsion may be formed when a surfactant (or a plurality of surfactants) and a polar phase (e.g., water or brine) contacts the reservoir formation and solubilities the nonpolar material encountered in the pores of the formation.

The microemulsion-based demulsifiers of this invention are effective for resolving a broad range of hydrocarbon and water emulsions encountered in crude oil production, refining, and chemical processing. Typical hydrocarbons include crude oil, refined oil, bitumen, condensate, slop oil, distillates, fuels, and mixtures thereof. The demulsifers are also useful for resolving emulsions in butadiene, styrene, acrylic acid, and other hydrocarbon monomer process streams. In the process of resolving crude petroleum oil emulsions of the water-in-oil type, the microemulsion-based demulsifiers are brought into contact with or caused to act upon the emulsion to be treated in any of the various methods now generally used in the petroleum industry to resolve or break crude petroleum oil emulsions with a chemical agent.

In an embodiment, the microemulsion-based demulsifiers of the invention are used to demulsify water-in-oil emulsions, oil-in-water emulsions, and complex emulsions in various production and refinery processes. In a refinery desalting process, the incoming crude is deliberately mixed with wash water to remove dissolved salts and other contaminants. To extract water from the resulting water-in-crude oil emulsion, the emulsion is admixed with an effective amount of the demulsifiers.

In embodiments, the microemulsion-based demulsifier is introduced into a crude oil emulsion by injecting beneath the surface into the oil well itself, by injecting into the crude oil at the well-head, or by injecting into the crude oil process stream at a point between the well-head and the final oil storage tank. The microemulsion-based demulsifier composition may be injected continuously or in batch fashion. The injecting is preferably accomplished using electric or gas pumps. The treated crude oil emulsion is then allowed to stand in a quiescent state until the desired separation into distinct layers of water and oil results. Once separation into distinct layers of water and oil has been effected, various means known in the art can be utilized for withdrawing the free water and separating the crude oil.

The microemulsion-based demulsifying formulations of the present invention may be used to prevent, break, or resolve water-in-oil, oil-in-water, and complex type emulsions and crude petroleum oil emulsions in particular. The present microemulsion-based demulsifiers may also be used to break hydrocarbon emulsions derived from refined mineral oil, gasoline, kerosene, etc. The present microemulsion-based demulsifiers may be applied at any point during the petroleum oil extraction and/or production process as is commonly known in the art. For instance, the present microemulsion-based demulsifiers may be introduced at the well head, via downhole injection, either continuously or periodically, or at any point between the wellhead and the final oil storage.

The amount of microemulsion-based demulsifiers used depends on the particular crude oil emulsion being treated. Bottle tests as described herein may be conducted on site in order to determine the optimum dose and formulation. In general, the effective amount of the microemulsion-based demulsifiers ranges from about 10 ppm to about 5,000 ppm based on the volume of crude production. In embodiments, about 50 ppm to about 500 ppm or from about 25 ppm to about 1,000 ppm may also be used.

In a typical process for demulsification of crude oil, a reservoir is provided to hold the composition of the invention in either diluted or undiluted form adjacent to the point where the effluent crude petroleum oil leaves the well. For convenience, the reservoir is connected to a proportioning pump capable of dropwise injecting the microemulsion-based demulsifier of the invention into the fluids leaving the well, which then pass through a flow line into a settling tank. Generally, the well fluids pass into the settling tank at the bottom of the tank so that incoming fluids do not disturb stratification of the layers of crude petroleum oil and water which takes place during the course of demulsification.

The present invention further contemplates a method for breaking an emulsion comprising oil and water. The method includes contacting the emulsion with any of the microemulsion-based demulsifiers as herein described. Consequently, the method may include contacting an emulsion with a microemulsion-based demulsifier composed of (i) an oil-like phase comprising at least one nonionic surfactant having a hydrophilic-lipophilic balance (HLB) of less than about 9; (ii) a coupling agent capable of stabilizing the microemulsion-based demulsifier composition; (iii) at least one water-soluble or dispersible nonionic surfactant that is different from the at least one nonionic surfactant in the oil-like phase; (iv) at least one additional surfactant selected from anionic, cationic, amphoteric, and combinations thereof; (v) at least one nonionic demulsifier; and (vi) water.

In a preferred aspect of this invention, the microemulsion-based demulsifer composition is used to demulsify water-in-oil emulsions in various production and refinery processes. In a refinery desalting process, the incoming crude is deliberately mixed with wash water to remove dissolved salts and other contaminants. To extract water from the resulting water-in-crude oil emulsion, the emulsion is admixed with an effective amount of the microemulsion-based demulsifier of this invention.

In the process of resolving crude petroleum oil emulsions of the water-in-oil type, the microemulsion-based demulsifying agent of the invention is brought into contact with or caused to act upon the emulsion to be treated in any of the various methods now generally used in the petroleum industry to resolve or break crude petroleum oil emulsions with a chemical agent. The treated crude oil emulsion is then allowed to stand in a quiescent state until the desired separation into distinct layers of water and oil results. Once separation into distinct layers of water and oil has been effected, various means known in the art can be utilized for withdrawing the free water and separating crude oil.

In a typical process for demulsification of crude oil, a reservoir is provided to hold the composition of the invention in either diluted or undiluted form adjacent to the point where the effluent crude petroleum oil leaves the well. For convenience, the reservoir is connected to a proportioning pump capable of dropwise injecting the microemulsion-based demulsifier of the invention into the fluids leaving the well, which then pass through a flow line into a settling tank. Generally, the well fluids pass into the settling tank at the bottom of the tank so that incoming fluids do not disturb stratification of the layers of crude petroleum oil and water which takes place during the course of demulsification.

Typical demulsifiers for breaking crude oil emulsions that may have utility in the compositions herein are described in U.S. Pat. Nos. 2,499,370; 2,557,081; 2,602,053; 3,640,894; 3,699,894; 3,684,735; 4,537,701; and U.K. Patent No. 2,118,937A, all of which are incorporated herein by reference.

The microemulsion-based demulsifier composition may also include corrosion inhibitors, viscosity reducers, and other chemical treatments used in crude oil production, refining and chemical processing. Additional optional solvents could be added such as: xylene, toluene, light or heavy aromatic naphtha, and the like. Each component contributes to different treating characteristics when added to the crude oil emulsion due to their unique chemical properties.

The invention in a preferred embodiment is a microemulsion-based demulsifier composition effective in resolving emulsions of oil and water. The oil may be any type of hydrocarbon encountered in oil and gas operations. In an embodiment, the disclosed demulsifier composition includes: (i) an oil-like phase comprising, (ii) at least one coupling agent, (iii) at least one water-soluble or dispersible nonionic surfactant that is different from the at least one nonionic surfactant in the oil-like phase, (iv) at least one additional surfactant, (v) at least one nonionic demulsifier, and (vi) water.

In an embodiment, the oil-like phase includes at least one nonionic surfactant having a hydrophilic-lipophilic balance (HLB) of less than about 9. In embodiments, the nonionic surfactant having an HLB of less than about 9 is selected from at least one of the following: linear and branched alkoxylated alcohols, alkoxylated alkylphenols, glycerol esters, glycol esters, polyetheyleneglycol esters, polyglycerol esters, sorbitol esters, ethylene oxide/propylene oxide copolymers, and combinations thereof. In embodiments with an alkoxylated alcohol, they may be selected from at least one of the following: ethoxylated and propoxylated $C_6$-$C_{20}$ alcohols; and mixtures thereof. The ethoxylated and propoxylated $C_6$-$C_{20}$ alcohols preferably have about 1-6 moles of ethylene oxide, or about 1-6 moles of propylene oxide, or 1-6 and 1-6 moles of ethylene oxide and propylene oxide, respectively, per mole of alcohol. The amount of the nonionic surfactant comprising the oil-like phase is preferably in the range of about 0.1% to about 35%, and more preferably, about 2% to 25%, by weight based on the total weight of the microemulsion-based demulsifier composition.

In an embodiment, the alkoxylated alcohol in the microemulsion-based demulsifier composition comprises about 1-6 moles of alkylene oxide per mole of alcohol.

In an embodiment, from about 0.1% to about 35% of the at least one nonionic surfactant of component (i) is present in the oil-like phase of the microemulsion-based demulsifier composition, based on weight.

In an embodiment, from about 2% to about 25% of the at least one nonionic surfactant of component (i) is present in the oil-like phase of the microemulsion-based demulsifier composition, wherein, based on weight.

In an embodiment, from about 2% to about 30% of the at least one nonionic surfactant of component (i) is present in the oil-like phase of the microemulsion-based demulsifier composition, based on weight.

In an embodiment, the coupling agent is capable of stabilizing the microemulsion-based demulsifier composition. In embodiments, the coupling agent is a water-soluble organic solvent. Representative water-soluble organic solvents include, for example, at least one of the following: short chain alcohols with between 1 and 6 carbon atoms; diols with between 1 and 6 carbon atoms; glycerol; alkyl ethers of alkylene glycols with between 1 and 6 carbon atoms; polyalkylene glycols less than 6 kD; and mixtures thereof. Representative short chain alcohols include, for example, at least one of the following: methanol, ethanol, n-propanol, and combinations thereof. Representative diols include, for example, at least one of the following: methylene glycol, ethylene glycol, propylene glycol, and combinations thereof. Representative alkyl ethers of alkylene glycols include, for example, ethylene glycol mono-n-butyl ether.

In an embodiment, from about 5% to about 40% of the coupling agent of component (ii) is present in the microemulsion-based demulsifier composition, based on the total weight of the composition.

In an embodiment, the microemulsion-based demulsifier composition includes at least one water-soluble or dispersible nonionic surfactant that is different from the at least one nonionic surfactant in the oil-like phase. In an embodiment, the water-soluble or dispersible nonionic surfactant includes, for example, an alkoxylated alcohol, ethylene oxide/propylene oxide copolymers, and/or alkoxylated alkylphenol having an HLB greater than about 10. In another embodiment, from about 2% to about 25% of the water-soluble or dispersible nonionic surfactant is present in the microemulsion-based demulsifier composition, based on total weight.

In an embodiment, from about 2 to about 20% of the anionic, cationic, amphoteric surfactant is present in the microemulsion-based demulsifier composition, based on total weight.

In an embodiment, the additional surfactant is selected from anionic surfactants, cationic surfactants, amphoteric surfactants, and combinations thereof. Representative additional surfactants include, for example, at least one of the following: linear alkylbenzene sulfonic acid, alkyl benzene sulfonate, alkane sulfonate, alkyl sulfate, alkyl ether sulfate, alkyl ammonium halides, alkyl aryl ammonium halides, imidazolium, cocoamidopropyl betaine, cocodimethyl betaine, alkyl amine oxide, and combinations thereof exclusive of combinations with both anionic and cationic surfactants.

The nonionic demulsifiers in the present invention include, for example, at least one of the following: polyethylenimine alkoxylates, alkoxylated alkylphenol formaldehyde resins, alkoxylated amine-modified alkylphenol formaldehyde resins, ethylene oxide/propylene oxide copolymers, cross-linked ethylene oxide/propylene oxide copolymers, alkoxylated sorbitan esters, and mixtures thereof. In an embodiment, up to about 30% or from about from about 2% to about 30% of the nonionic demulsifier is present in the microemulsion-based demulsifier composition, based on total weight. In another embodiment, up to about 25% of the water-soluble or dispersible nonionic surfactant is present in the microemulsion-based demulsifier composition, based on total weight. In an embodiment, from about 5% up to about 25% of the nonionic demulsifier is present in the microemulsion-based demulsifier composition, based on total weight. These microemulsion-based demulsifers can also be used at the well head or be injected downhole to break the emulsion. Since the microemulsion contains very tiny droplets which encapsulate the demulsifier, it then can migrate more quickly to the oil and water interface than a non-microemulsion demulsifier. As a result, the demulsification efficiency is increased.

The disclosed. microemulsion-based demulsifier composition may further include additional components or adjuncts, such as at least one of oxidizing agents, water-soluble enzymes, precursors to these components, and combinations thereof.

The present invention also provides a method of resolving emulsions of oil and water. The oil phase may be at least one or more hydrocarbons encountered in oil and gas operations. The method includes (i) adding at least one variation of the disclosed microemulsion-based demulsifier composition to the emulsion of oil and water. The addition may take place at any point, including at the well head, be injected to the reservoir during fracturing process, be injected before the separator, or be injected downhole to break or prevent the emulsion.

In an embodiment, the method of the invention further includes forming a single phase microemulsion in situ in the subterranean reservoir, where the in situ-formed single phase microemulsion is a thermodynamically stable, macroscopically homogeneous mixture of at least the following components (as described in more detail herein): (i) an oil-like phase comprising at least one nonionic surfactant having a hydrophilic-lipophilic balance (HLB) of less than about 9; (ii) a coupling agent capable of stabilizing the microemulsion flowback aid composition; (iii) at least one water-soluble or dispersible nonionic surfactant that is different from the at least one nonionic surfactant in the oil-like phase; (iv) at least one additional surfactant selected from anionic, cationic, amphoteric, and combinations thereof; (v) at least one nonionic demulsifier (vi) water; and a nonpolar material derived from the subterranean formation.

The microemulsion-based demulsifier of the present invention may also be applied in the presence of additional chemicals. For example, they may be applied in combination with additional demulsifiers or in combination with any of a number of additional demulsifiers known in the art including for example, alcohols, fatty acids, fatty amines, glycols, and alkylphenol formaldehyde condensation products. The microemulsion-based demulsifiers may also be used in combination with corrosion inhibitors, viscosity reducers, and other chemical treatments used in crude oil production, refining and chemical processing. Several additional chemicals such as friction reducers, scale inhibitors, clay swelling inhibitors, biocides, flow back aids, and surfactants may be added on the fly during treatment with the composition of the present invention.

The foregoing may be better understood by reference to the following examples, which are intended for illustrative purposes and are not intended to limit the scope of the invention or its application in any way.

EXAMPLE 1

Preparation of the Microemulsion-Based Demulsifiers

This example provides representative formulations for the demulsifiers of the invention.

Sample 310-2: 3% alcohol ethoxylate ($C_{12}$+3 EO); 5.2% EO/PO copolymer (water dispersible); 2.7% ethoxylated $C_8$ alcohol; 2.7% EO/PO copolymer (water soluble); 0.1% linear alkylbenzene sulfonic acid; 7% alkoxylated polyethyleneimine (demulsifier); 1.3% polyethylene glycol; 40% propylene glycol; and 38% water.

VX10540: 3% alcohol ethoxylate ($C_{12}$+3 EO); 3% EO/PO copolymer; 2% dioctylsulfosuccinate (DOS); 3% tridecyl alcohol ethoxylate ($C_{13}$+9EO); 9% cross-linked EO/PO block copolymer (demulsifier); 10% glycerin; 30% IPA; and 40% water.

EXAMPLE 2

Particle Size Distribution

Figure 1:
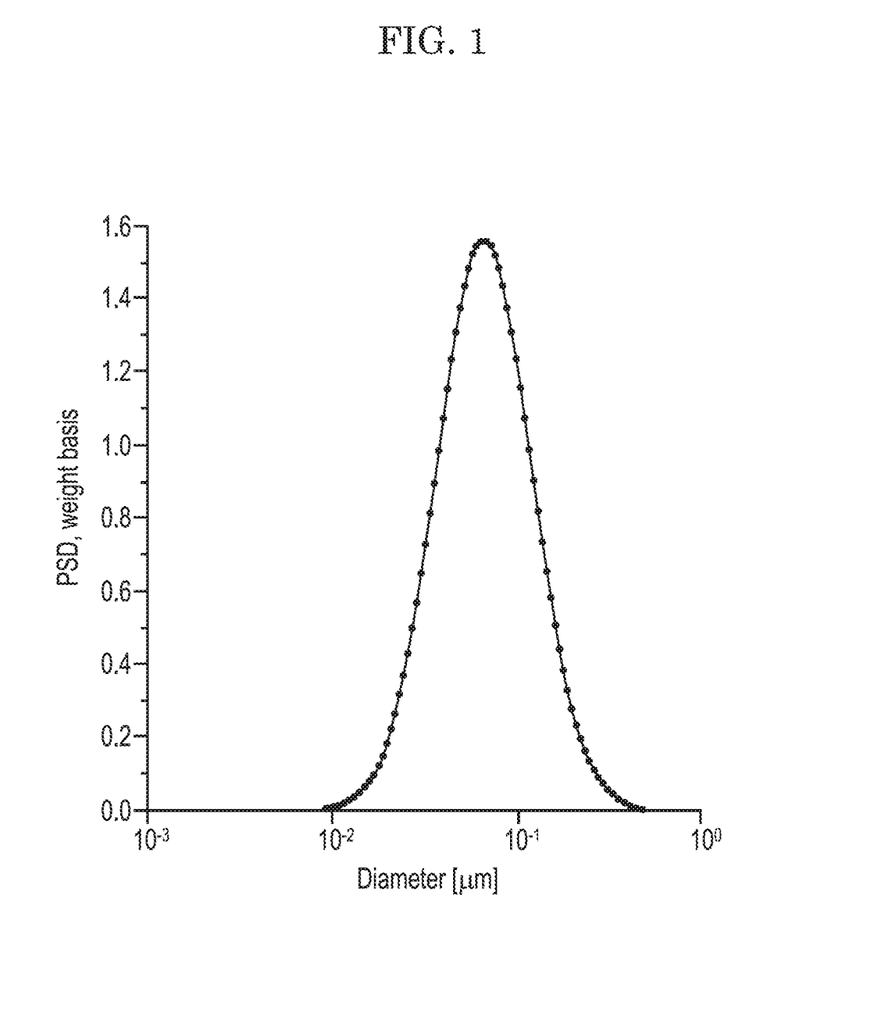
FIG. 1 shows a particle size distribution spectra obtained for sample VX10540 where a single unimodal size distribution was observed.

FIG. 1 shows the particle size distribution for one embodiment of the microemulsion-based demulsifier of the invention. Sample VX10540 (3% alcohol ethoxylate ($C_{12}$+3EO), 3% EO/PO copolymer, 2% dioctylsulfosuccinate (DOS), 3% tridecyl alcohol ethoxylate ($C_{13}$+9EO), 9% cross-linked EO/PO block copolymer, 10% glycerin, 30% IPA, 40% water). It can be seen that the particle size distribution spectra for VX10540 shows a unimodal particle size distribution with an average droplet size of 0.0776 μm and a median droplet size of 0.0655 μm. This result confirms that VX10540 is indeed a microemulsion system. Due to the presence of very small droplets (0.01-0.5 μm), microemulsions are transparent or translucent.

EXAMPLE 3

Emulsion Prevention Test

This test was performed to compare the ability of various demulsifiers to prevent emulsion formation when contacted with residual oil. Various demulsifiers were added to 25 ml of 4% KCl with pH adjust to 11. Twenty five (25) ml of 4% KCl containing the demulsifier was mixed with twenty five (25) ml of oil obtained from West Texas and blended at 14,000 rpm in a Waring Blender for 1 minute to emulsify the two liquids. The emulsion was then poured into a 6-oz glass prescription bottle (an industry standard for this test) to observe the water breakout from the emulsion, water quality, interface quality, and wettability. Table 1 shows the results using commercially available samples along with the results using the sample 110-2 from Example 1. The results show the present invention (sample 110-2) is superior to currently available commercial samples (Products A and B) with regard to quicker water drop out, sharp interface, clean water, and excellent wettability. Product B is a non-microemulsion commercial product which contains methanol, water, water-soluble nonionic surfactants, and ethoxylated alkylphenol formaldehyde resins.

TABLE 1

Emulsion Prevention Test % Breakout

| Sample | Dosage (gpt) of Brine | 30 sec | 72 hrs | Interface | Water quality | Wettability |
|---|---|---|---|---|---|---|
| Untreated | 0 | 0 | 10 | Ragged | Dirty | Poor (oil adhered to glass) |
| 110-2 | 1 | 100 | 100 | Clean/sharp | Clear | Excellent |
| Product A | 1 | 80 | 100 | Clean | Hazy | Poor (oil adhered to glass) |
| Product B | 2 | 100 | 100 | Clean | Clear | Poor |

EXAMPLE 4

Emulsion Prevention Test

The crude oils shown below were used for the tests in this example.

| Crude Label | Crude Type | Origin |
|---|---|---|
| Crude A | High Asphaltene | Gulf of Mexico |
| Crude B | High Asphaltene | West Texas |
| Crude C | High Asphaltene | Gulf of Mexico |
| Crude D | High Asphaltene | Illinois |
| Crude E | High Asphaltene | Russia |
| Crude F | Low Asphaltene | North Dakota |
| Crude G | Low Asphaltene | West Africa |
| Crude H | Low Asphaltene | Illinois |
| Crude I | Low Asphaltene | South Texas |

Table 2 below shows the results of the overall fluid quality evaluation for all the crudes tested. Each crude was tested against a blank (no additives, only 4% KCl solution), product A which is a non-microemulsion commercial product which contains methanol, water, water-soluble nonionic surfactants, and ethoxylated alkylphenol formaldehyde resins, (1 gallon per thousand gallons ("gpt") in 4% KCl solution) and VX10540 (1 gallon per thousand gallon in 4% KCl solution). Table 2 shows the overall fluid quality evaluation of untreated crude oils tested. Water quality was observed after the phase separation. The quality should preferably be clear and free of solid particles since the water is often used for re-injection. The preferred interface is at the oil/water boundary ("interface") and should be sharp after the separation or an emulsion layer can build up and cause deposition and/or loss of oil. Wettability is described as how the oil wets the substrate (i.e., glass in this case) where oil sticking to the substrate (i.e., rocky substrate in a formation) is not preferred as a decrease in oil production would occur.

TABLE 2

| Crude | Sample | Oil Quality | Water Quality | Interface | Wettability |
|---|---|---|---|---|---|
| | Blank | — | — | — | Oil in glass walls |
| A | 1 gpt Product A | — | Clear | Sharp | — |
| | 1 gpt VX10540 | — | Clear | Sharp | — |
| | 4% KCl | — | — | — | Oil in glass walls |
| B | 1 gpt Product A | — | Clear | Sharp | Oil drops in glass surface |
| | 1 gpt VX10540 | — | Clear | Sharp | — |
| | Blank | — | — | — | Oil in glass walls |
| C | 1 gpt Product A | — | Clear | Sharp | Oil drops glass in surface |
| | 1 gpt VX10540 | — | Clear | Sharp | — |
| | Blank | — | — | — | Oil in glass walls |
| D | 1 gpt Product A | — | Clear | Ragged | Oil drops in glass surface |
| | 1 gpt VX10540 | — | Clear | Sharp | — |
| | Blank | — | — | — | Oil in glass walls |
| E | 1 gpt Product A | — | Clear | Ragged | Oil drops in glass surface |
| | 1 gpt VX10540 | — | Clear | Sharp | — |
| | Blank | Water droplets | — | Bag | Oil in glass walls |
| F | 1 gpt Product A | — | Clear | Sharp | Oil drops in glass surface |
| | 1 gpt VX10540 | — | Clear | Sharp | — |
| | Blank | — | — | — | Oil in glass walls |
| G | 1 gpt Product A | — | Clear | Sharp | Oil drops in glass surface |
| | 1 gpt VX10540 | — | Clear | Sharp | — |
| | Blank | — | Clear | Ragged | Oil drops in glass surface |

TABLE 2-continued

| Crude | Sample | Oil Quality | Water Quality | Interface | Wettability |
|---|---|---|---|---|---|
| H | 1 gpt Product A | — | Clear | Sharp | — |
| | 1 gpt VX10540 | — | Clear | Sharp | — |

Figure 2A:
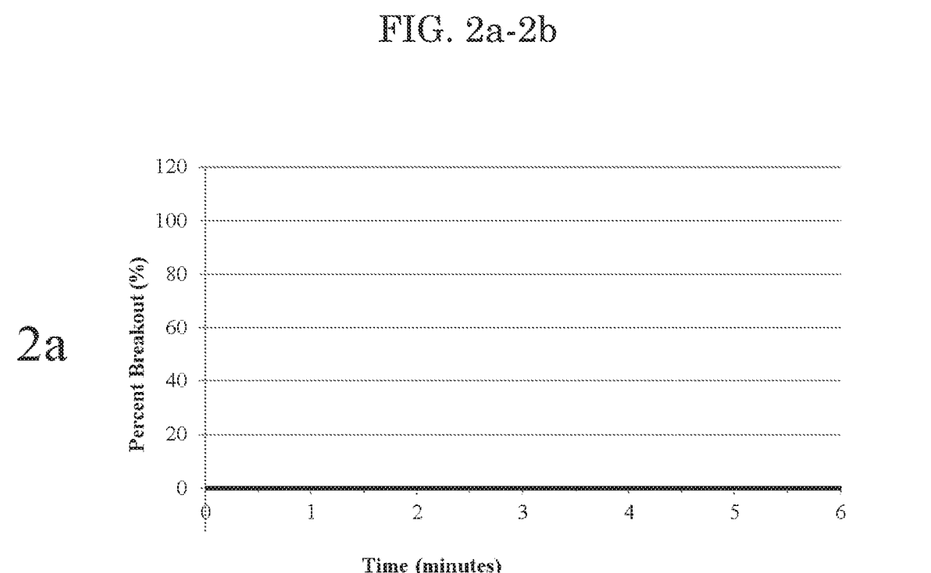
FIG. 2a-2d show the volume percent water drop-out measured over time for all crudes and the two additives tested.
Figure 2B:
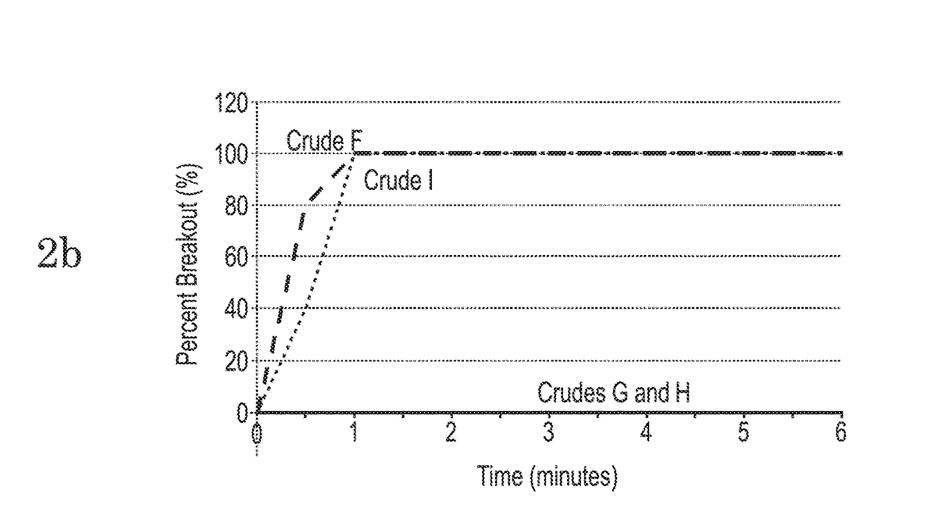
Figure 2C:
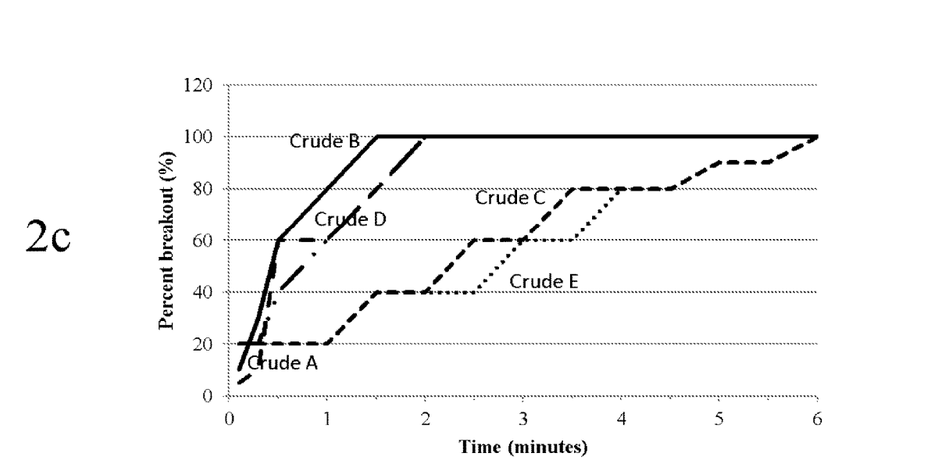
Figure 2D:
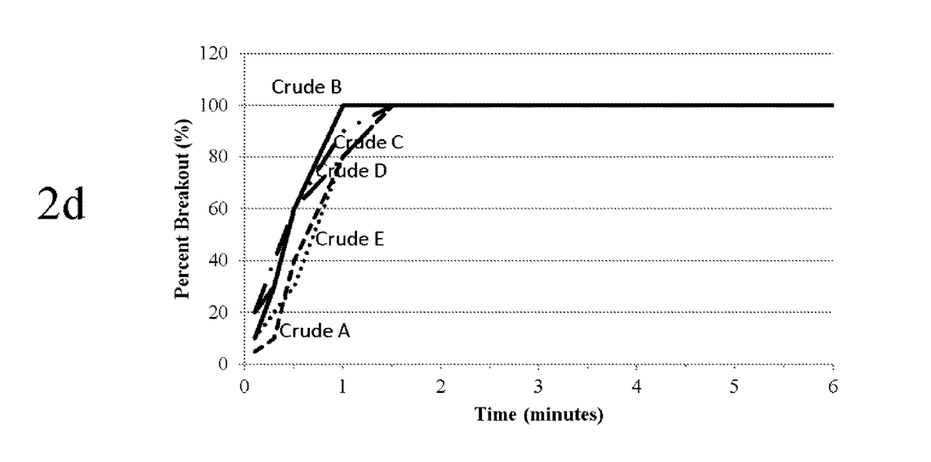

FIGS. 2a-2d show the volume percent water drop-out measured over time for all crudes and the two demulsifiers tested. In all cases, VX10540 facilitated a faster breakout time than Product A. FIG. 2a shows percent breakout vs. time results for crude oils (A, B, C, D, and E) in a 4% KCl (pH 10.9) aqueous solution (blank). The emulsions formed remained stable even after 72 hours. FIG. 2b shows percent breakout vs. time results for specified crude oils in a 4% KCl (pH 10.9) aqueous solution (blank). The emulsions formed by crude oils G and H remained stable even after 72 hours. Crude oils F and I showed a 100% breakout in 1 minute. FIG. 2c shows percent breakout vs. time results for specified crude oils in a 1 gpt Product A—4% KCl solution. A, B, and D crudes showed a 100% breakout by 2 minutes. C and E crudes needed up to 6 minutes to separate a 100% when using 1 gpt of product Product A. FIG. 2d shows percent breakout vs. time results for specified crude oils in a 1 gpt VX10540—4% KCl solution. A, B, C, D, and E crudes showed a 100% breakout by 1.5 minutes when using 1 gpt of VX10540.

A fast oil/water separation was observed when the novel microemulsion-based demulsifier VX10540 was used with different crude oil samples. A 100% volume water drop-out was achieved in less than 2 minutes, a sharp oil/water interface was obtained, good water quality, and no oil droplets were observed over the glass surface. For these particular studies and oil samples, microemulsion-based demulsifer VX10540 exhibited a clear improved performance when compared to the current market product Product A at a 1 gpt dosage in a 4% KCl solution (pH 10.9).

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. Any and all patents, patent applications, scientific papers, and other references cited in this application, as well as any references cited therein, are hereby incorporated by reference in their entirety. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

The invention claimed is:

1. A method of resolving an emulsion of water and crude petroleum oil, the method comprising:
    obtaining a crude petroleum oil from a subterranean reservoir;
    mixing the crude petroleum oil with a wash water, resulting in a water-in-crude oil emulsion;
    adding a demulsifier composition to the water-in-crude oil emulsion to form a treated emulsion, the demulsifier composition comprising: (i) a first nonionic surfactant having a hydrophilic-lipophilic balance (HLB) of less than about 9; (ii) a coupling agent capable of stabilizing the demulsifier composition in the amount of from about 5% to about 40% based on the total weight of the demulsifier composition; (iii) a second nonionic surfactant that is water-soluble or dispersible and is different from the first nonionic surfactant; (iv) at least one nonionic demulsifier comprising a polyethyleneimine alkoxylate, a cross-linked ethylene oxide/propylene oxide copolymer, or combinations thereof; and (v) water; and
    separating the crude petroleum oil from the water.

2. The method of claim 1 wherein the adding is accomplished by injecting the demulsifier composition into a crude oil process stream between a well head and a final oil storage tank.

3. The method of claim 1 wherein the adding is accomplished continuously or in batch fashion.

4. The method of claim 1, further comprising allowing the treated emulsion to stand in a quiescent state for a period of time sufficient to obtain separation of the treated emulsion into distinct layers of water and oil prior to the separating.

5. The method of claim 4, wherein the allowing the treated emulsion to stand is accomplished in a settling tank.

6. The method of claim 1 wherein the amount of the demulsifier composition added to the water-in-crude oil emulsion is about 10 ppm to 5000 ppm based on the volume of crude oil production.

7. The method of claim 1, wherein the first nonionic surfactant having an HLB of less than about 9 comprises an alkoxylated alcohol, an alkoxylated alkylphenol, a glycerol ester, a glycol ester, a polyethyleneglycol ester, a polyglycerol ester, a sorbitol ester, an ethylene oxide/propylene oxide copolymer, or a combination thereof.

8. The method of claim 7, wherein the alkoxylated alcohol is selected from the group consisting of ethoxylated and propoxylated $C_6$-$C_{20}$ alcohols; and mixtures thereof.

9. The method of claim 8, wherein said alkoxylated alcohol comprises about 1-6 moles of alkylene oxide per mole of alcohol.

10. The method of claim 1, wherein the amount of the first nonionic surfactant is about 0.1% to about 35% by weight based on the total weight of the demulsifier composition.

11. The method of claim 1, wherein the amount of the first nonionic surfactant is about 2% to about 25% by weight based on the total weight of the demulsifier composition.

12. The method of claim 1, wherein the coupling agent is a water-soluble organic solvent.

13. The method of claim 12, wherein the water-soluble organic solvent is selected from the group consisting of short chain alcohols with between 1 and 6 carbon atoms; diols with between 1 and 6 carbon atoms; glycerol; alkyl ethers of alkylene glycols with between 1 and 6 carbon atoms; polyalkylene glycols less than 6 kD; and mixtures thereof.

14. The method of claim 1, wherein from about 2% to about 30% of the at least one nonionic demulsifier is present, based on total weight.

15. The method of claim 1, wherein the second nonionic surfactant includes an alkoxylated alcohol, ethylene oxide/ propylene oxide copolymers, and/or alkoxylated alkylphenol having an HLB greater than about 10.

16. The method of claim 1, wherein from about 2% to about 25% of the second nonionic surfactant is present, based on weight.

* * * * *